United States Patent [19]
Mullens

[11] Patent Number: 6,018,164
[45] Date of Patent: Jan. 25, 2000

[54] TRANSPARENCY SENSORS

[75] Inventor: Richard A. Mullens, Welwyn Garden City, United Kingdom

[73] Assignee: Xerox Corporation, Stamford, Conn.

[21] Appl. No.: 08/974,449

[22] Filed: Nov. 20, 1997

[30] Foreign Application Priority Data

Dec. 18, 1996 [GB] United Kingdom ................ 96 262 18

[51] Int. Cl.[7] .................................................. G01N 21/86
[52] U.S. Cl. ..................................... 250/559.4; 356/239.1
[58] Field of Search ................ 250/559.4; 356/429–431, 356/239.1

[56] References Cited

U.S. PATENT DOCUMENTS

| 4,459,023 | 7/1984 | Reich et al. | 250/223 B |
| 5,139,339 | 8/1992 | Courtney et al. | 356/446 |

FOREIGN PATENT DOCUMENTS 2 120 382   3/1983   United Kingdom .

*Primary Examiner*—Que T. Le
*Attorney, Agent, or Firm*—William A. Henry, II

[57] ABSTRACT

An improved transparency sensor (10) uses Brewster's Law to detect the presence of sheets of transparency material (20). The sensor (10) includes a light emitting diode (LED) (12) and two photodiodes (14, 16) arranged to receive light reflected from the material (20). The LED (12) supplies incident light at an angle ($\theta$) which is related to the refractive index of the transparency material (20) to be detected. A polarizing filter (18) is associated with one of the photodetectors (16) and is oriented to cut out substantially reflected polarized light entering that photodiode (16). Output signals from the photodetectors (14, 16) are processed in a comparator (40) which provides an output signal (42) indicating the presence or not of a transparency material (20).

7 Claims, 1 Drawing Sheet

TRANSPARENCY SENSORS

BACKGROUND OF THE INVENTION

1. Field of the Invention

The present invention relates to improvements in or relating to transparency sensors.

It is well known to use sensors to detect the presence of paper in photocopying and/or printing apparatus. These sensors may operate in either a transmission or a reflection mode.

2. Description of the Prior Art

In the transmission mode, a radiation emitter, for example, a light emitting diode (LED), is positioned on one side of a paper path with an appropriate detector positioned on the other side of the paper path and aligned with the emitter to receive at least a portion of the radiation emitted therefrom. The detector, on detection of radiation from the emitter, produces an output signal indicating that no paper is present. When paper is in the paper path, radiation from the emitter reaching the detector is substantially reduced as the presence of paper cuts down the amount of radiation reaching the detector. This change in output signal produced by the detector indicates that paper is present.

In the reflection mode, the emitter directs radiation onto a surface, preferably a highly reflective surface, in the paper path and the detector is positioned to receive radiation reflected from that surface. When no paper is present, the detector provides an output signal and when paper is present, the output signal changes accordingly.

Moreover, it is desired to discriminate between sheets of paper and transparency sheets so that transparency sheets are not directed onto an unsuitable path in the apparatus, for example, to a duplex tray for double-sided copies. U.S. Pat. Nos. 4,540,887, 5,139,339, 5,329,338 and United Kingdom Patent Application GB 2 120 382 A describe optical sensing arrangements for effecting such discrimination and may be relevant to various aspects of the present invention.

U.S. Pat. No. 5,329,338 discloses an optical transparency detection and discrimination arrangement for use in an electronic reprographic printing system. The arrangement utilizes a plurality of diffuse reflective sensors positioned adjacent portions of the path over which a copy sheet moves. Each sensor is positioned so that its optical axis intersects with the copy sheet so that the angle of intersection lies within a specified range of angles for a maximum length of copy sheet. A pair of sensors are located at inlet baffles for detection and discrimination of the copy sheet. One sensor is arranged with its optical axis perpendicular to the copy sheet, and detects both paper and transparency copy sheets. The other sensor is arranged with its optical axis angled to the copy sheet so that only paper copy sheets are detected but not transparency copy sheets, the angle being chosen such that it is outside the range in which the sensor can detect a transparency, but within the range in which paper can be detected.

U.S. Pat. No. 4,540,887 discloses a high contrast ratio paper sensor arrangement which can be operated in both a transmissive and a reflective mode. In both modes of operation, a light emitter is arranged on one side of the paper path. A pair of photodetectors is used to detect radiation from the paper path. One detector is arranged on either the same side of the paper path as the emitter (reflective mode) to detect reflected radiation, or on the other side of the paper path to the emitter (transmissive mode) to detect transmitted radiation. In each case, the detector provides a first output signal in accordance with the radiation sensed either by reflection or transmission. The other detector is positioned on the same side of the paper path as the light emitter to detect diffuse radiation and provide a second output signal which corresponds to the diffuse radiation sensed. The two photodetectors are connected in a circuit wherein the second (or diffuse) output signal is subtracted from the first output signal.

U.S. Pat. No. 5,139,339 describes a media discriminating and media presence sensor in which a light emitter is arranged on one side of the media path. A pair of photodetectors is used to detect radiation from the media path. Both detectors are arranged on the same side of the media path as the emitter. The emitter and one detector (angle detector) are positioned at equal and opposite angles to the media surface while the other detector (normal detector) is positioned to be normal to the media surface. A non-reflective surface is used as a target when media is absent from the media path. When paper is present on the media path, the output signal from the angle detector is low and the output signal from the normal detector is high. When a transparency material is present, either alone or paper-backed, the output from the angle detector is high and the output from the normal detector is indeterminate and high respectively. When no media is present, the output signals from both detectors are low. The output signals from the respective angle and normal detectors provide a logic table indicating the presence of no media and the type of media.

GB 2 120 382 A describes an apparatus for detecting the presence of a transparency or thin paper using a light source and a light detector. Polarizing filters are placed in front of both the light source and detector. When the planes of polarization of both filters are parallel, attenuation resulting from the positioning of either a transparency or paper between the source and detector is significantly increased making possible the detection of a transparency or thin paper.

It is therefore an object of the present invention to provide a simple and effective way of detecting the presence of transparency sheets.

SUMMARY OF THE INVENTION

In accordance with one aspect of the present invention, there is provided a sensor for detecting sheets of transparency material in a media path, the sensor comprising: a radiation source; a pair of detector elements positioned to receive radiation reflected from the media path and for providing output signals indicative of the received reflected radiation; and processing means for receiving the output signals from the detector elements and processing those signals to provide an output signal indicative of the presence of a sheet of transparency material; characterized in that at least one detector element has a polarizing filter associated therewith, and in that the radiation source is positioned to provide incident radiation at an angle which is related to the transparency material to be detected in accordance with Brewster's Law.

It is preferred that a single polarizing filter is oriented substantially to cut out the reflected polarized radiation entering its associated detector element.

Alternatively, both detector elements may have respective polarizing filters associated therewith, the filters being respectively oriented to transmit and cut out polarized radiation reflected from the transparency material.

The sensor of the present invention enables a compact arrangement to be provided which is situated on one side of a media path.

BRIEF DESCRIPTION OF THE DRAWINGS

For a better understanding of the present invention, reference will now be made, by way of example only, to the accompanying drawing, the single FIGURE of which is a block diagram of a transparency sensor arrangement in accordance with the present invention.

In the FIG. 1, a transparency sensor 10 in accordance with the present invention is shown. The sensor 10 comprises an emitter 12, for example, a light emitting diode (LED), a pair of detectors 14, 16, for example, photodiodes, arranged to receive light reflected from upper surface 22 of a sheet of material 20 located in a media path 30, and a polarizing filter 18 positioned over the photodiode 16 in an optical path from surface 22 to the photodiode 16. Media path 30 is chosen to be substantially absorptive so that any incident light is not reflected towards the photodiodes 14, 16. A comparator device 40 is electrically connected to receive output signals from the photodiodes 14, 16 in response to the light detected or sensed. Comparator device 40 compares the two output signals from the photodiodes 14, 16 and provides an output signal 42 if and only if the difference between the two output signals exceeds a predetermined threshold value, the output signal 42 being indicative of whether the material 20 is a transparency or not.

Figure 1:
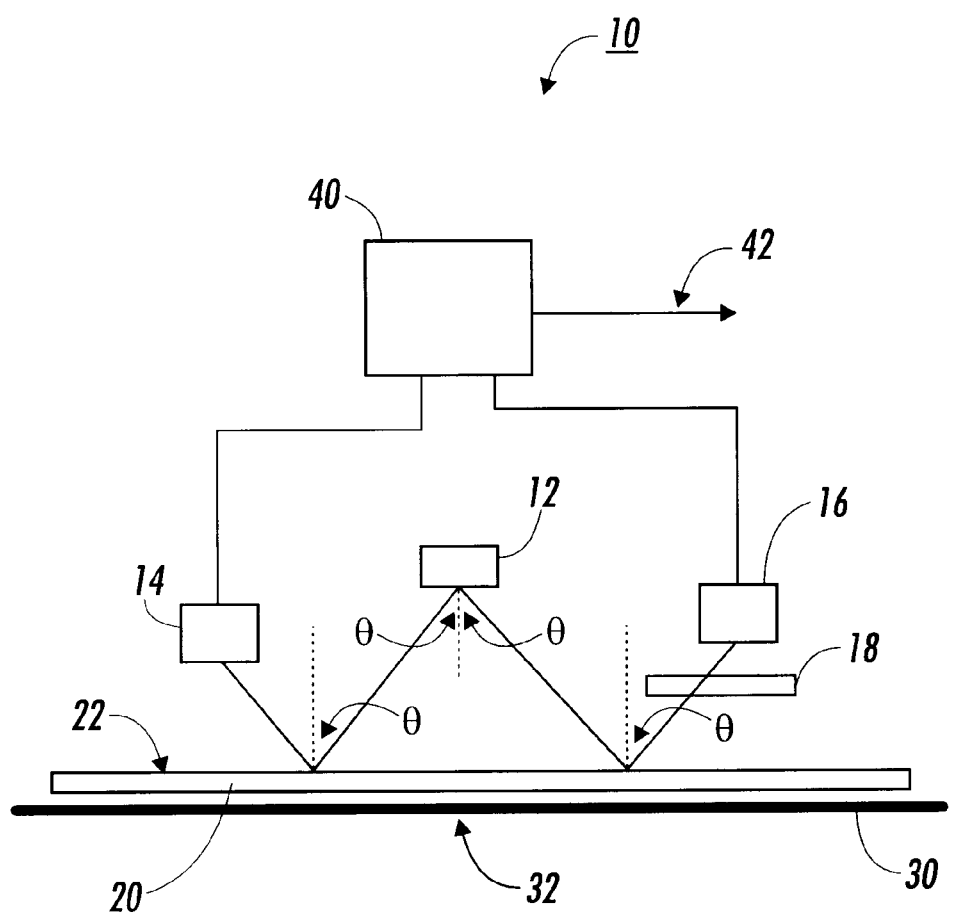

The sensor 10 distinguishes between paper and transparency material as light reflected off a transparency material is strongly polarized, whereas the light scattered from paper is only slightly polarized. The polarization of light by reflection is greatest when the tangent of the angle of incidence is equal to the refractive index, n, of the reflective material. This is Brewster's law, that is, $\theta = \tan^{-1} n$.

In accordance with the present invention, light from LED 12 is directed onto surface 22 of material 20 at an angle θ to the vertical, that is, the angle of incidence on the material 20. As the present invention is solely concerned with the detection of transparency materials, the angle of incidence θ for the light from LED 12 is chosen to be around the Brewster angle for most transparency materials. This produces strongly polarized reflected light from surface 22 when the material 20 is a transparency material.

Photodiode 14 receives reflected light directly from surface 22, whilst photodiode 16 receives reflected light from surface 22 after it has passed through the polarizing filter 18. Polarizing filter 18 is oriented with respect to the optical path such that it extinguishes substantially all the light which is polarized by reflection and cuts down the amount of light reaching photodiode 16. Each photodiode 14, 16 provides respective output signals for comparator 40. Comparator 40 uses these output signals to provide output signal 42 which is indicative of whether a transparency material is present in the media path or not. If a paper sheet is present, both photodiodes 14, 16 provide output signals as the reflected light is not strongly polarized and is therefore not affected by the polarizing filter 18. If a transparency sheet is present, only photodiode 14 will provide an output signal to the comparator 40 as the reflected polarized light is substantially cut off by polarizing filter 18 and very little light, if any, reaches photodiode 16 which provides an appropriate signal to comparator 40. If no sheets are present, neither photodiode 14, 16 produces an output signal as the light emitted from LED 12 is absorbed by media path 30.

In another embodiment of the present invention (not shown), the two photodiodes 14, 16 may be arranged side-by-side. In this case, both photodiodes 14, 16 can be covered by polarizing filters, one filter being oriented to transmit polarized light and the other filter to block polarized light. The output signals from the two photodiodes are evaluated as previously described.

Area 32 in media path 30 directly beneath the LED 12 should be non-reflective (or absorptive as discussed above) so that no output signals are produced by the photodiodes 14, 16 when no material 20 is present in the path 30. It is preferred that a hole (not shown) be formed in the area 32 so that the light from the LED 12 passes into it when no material is present.

The sensor of the present invention has the advantage that light is not required to pass through the material, and provides a simple sensor arrangement which does not have alignment problems.

It will be seen that according to the present invention, an advantageous method and apparatus is provided for detecting sheets of transparency material in a media path. While the invention has been herein shown and described in what is presently conceived to be the most practical and preferred embodiment thereof, it will be apparent to those skilled in the art that many modifications may be made thereof within the spirit and scope of the invention, which scope is to be accorded the broadest interpretation of the appended claims so as to encompass all equivalent structures and methods.

I claim:

1. A sensor for detecting sheets of transparency material in a media path, the sensor comprising:

a radiation source;

a pair of detector elements positioned to receive radiation reflected from the media path and for providing output signals indicative of the received reflected radiation; and a comparator device for receiving the output signals from the detector elements and processing those signals to provide an output signal indicative of the presence of a sheet of transparency material;

and wherein at least one of said detector elements has a polarizing filter associated therewith, and wherein said radiation source is positioned to provide incident radiation at an angle (θ) which is related to the transparency material to be detected in accordance with Brewster's law.

2. The sensor according to claim 1, wherein said polarizing filter is oriented substantially to cut out the reflected polarized radiation entering its associated detector element.

3. The sensor according to claim 2, wherein both detector elements have respective polarizing filters associated therewith, said polarizing filters being respectively oriented to transmit and cut out polarized radiation reflected from the transparency material.

4. A sensor for detecting sheets of transparency in a media path, the sensor comprising:

a radiation source;

a pair of detector elements positioned to receive radiation reflected from the media path and for providing output signals indicative of the received reflected radiation;

a comparator device that receives said output signals from said detector elements and processes those signals to provide an output signal indicative of the presence of a sheet of transparency material; and a polarizing filter positioned between one of said detector elements and the transparency material to be detected, and wherein said radiation source is positioned to provide incident radiation at a predetermined angle that is related to the transparency material to be detected.

5. The sensor according to claim 4, wherein said polarizing filter is oriented substantially to cut out the reflected polarized radiation entering its associated detector element.

6. A method for detecting sheets of transparency in a media path, the steps of comprising:

providing a radiation source;

positioning a pair of detector elements to receive radiation reflected from the media path and provide output signals indicative of the received reflected radiation;

providing a comparator device for receiving said output signals from said detector elements and processes those signals to provide an output signal indicative of the presence of a sheet of transparency material; and providing a polarizing filter positioned between one of said detector elements and the transparency material to be detected, such that said radiation source is positioned to provide incident radiation at a predetermined angle that is related to the transparency material to be detected.

7. The method according to claim 6, including the step of positioning said polarizing filter to substantially cut out the reflected polarized radiation entering its associated detector element.

* * * * *